United States Patent
Pichon et al.

(10) Patent No.: US 10,718,127 B2
(45) Date of Patent: Jul. 21, 2020

(54) AUTOMATIC SWIMMING POOL CLEANERS WITH FILTER-LOADING INDICATORS

(71) Applicant: Zodiac Pool Care Europe, Bron (FR)

(72) Inventors: Philippe Pichon, Villeneuve de Riviere (FR); E. Keith McQueen, Vista, CA (US)

(73) Assignee: ZODIAK POOL CARE EUROPE, Bron (FR)

( * ) Notice: Subject to any disclaimer, the term of this patent is extended or adjusted under 35 U.S.C. 154(b) by 56 days.

(21) Appl. No.: 16/046,517

(22) Filed: Jul. 26, 2018

(65) Prior Publication Data

US 2019/0032357 A1    Jan. 31, 2019

Related U.S. Application Data

(60) Provisional application No. 62/537,601, filed on Jul. 27, 2017.

(51) Int. Cl.
| | | |
|---|---|---|
| *E01H 1/05* | (2006.01) | |
| *E01H 1/04* | (2006.01) | |
| *E04H 4/16* | (2006.01) | |
| *B01D 46/00* | (2006.01) | |

(52) U.S. Cl.
CPC ....... *E04H 4/1654* (2013.01); *B01D 46/0086* (2013.01)

(58) Field of Classification Search
CPC ............................ E04H 4/1654; B01D 46/0086
See application file for complete search history.

(56) References Cited

U.S. PATENT DOCUMENTS

| | | | |
|---|---|---|---|
| 5,961,822 A | 10/1999 | Polimeni, Jr. | |
| 6,965,814 B2 | 11/2005 | Hadari | |
| 8,394,266 B2 * | 3/2013 | Pichon | E04H 4/1654 15/1.7 |
| 9,708,826 B2 * | 7/2017 | Michelon | E04H 4/16 |
| 2015/0101135 A1 * | 4/2015 | Witelson | H02J 7/02 15/1.7 |
| 2015/0191925 A1 * | 7/2015 | Maggeni | C02F 1/001 210/85 |
| 2015/0191926 A1 | 7/2015 | Tavor et al. | |
| 2017/0293490 A1 * | 10/2017 | Hanan | E04H 4/1654 |

FOREIGN PATENT DOCUMENTS

| | | |
|---|---|---|
| EP | 2891756 | 7/2015 |
| EP | 2987926 | 2/2016 |
| WO | 2017055740 | 4/2017 |

OTHER PUBLICATIONS

PCT/IB2018/055614, "International Search Report and Written Opinion", dated Oct. 30, 2018, 13 pages.
International Application No. PCT/IB2018/055614, International Preliminary Report on Patentability dated Feb. 6, 2020, 9 pages.

* cited by examiner

*Primary Examiner* — Dung Van Nguyen
(74) *Attorney, Agent, or Firm* — Kilpatrick Townsend & Stockton LLP; Dean W. Russell

(57) ABSTRACT

Apparatus and techniques for indicating loading of filters are described. The apparatus and techniques are especially (although not necessarily exclusively) useful in connection with automatic pool cleaners with on-board filters and pumps. Indicators identifying clogging of the filters may be included in or on the cleaners or transmitted as information to users for further action.

13 Claims, 9 Drawing Sheets

Typical Curve

AUTOMATIC SWIMMING POOL CLEANERS WITH FILTER-LOADING INDICATORS

CROSS-REFERENCE TO RELATED APPLICATION

This application claims the benefit of and priority to U.S. Provisional Patent Application Ser. No. 62/537,601, filed Jul. 27, 2017, and having the same title as appears above, the entire contents of which application are hereby incorporated herein by this reference.

FIELD OF THE INVENTION

This invention relates to systems and apparatus for cleaning water-containing vessels such as swimming pools and spas and more particularly, although not necessarily exclusively, to automatic swimming pool cleaners (APCs) configured to provide information as to whether, or to what extent, on-board debris filters are clogged.

BACKGROUND OF THE INVENTION

Numerous cleaning devices capable of autonomous movement within swimming pools and spas currently exist. The most common of these devices are APCs, which often are either hydraulic or robotic in type. Hydraulic cleaners vary water flow for movement, while robotic cleaners typically employ electric motors to cause motion. Hydraulic APCs, furthermore, subdivide into "pressure-side" and "suction-side" cleaners, with pressure-side cleaners being fluidly connected to outputs of pumps of pool water circulation systems and suction-side cleaners being fluidly connected to inputs of such pumps.

Water vacuumed into suction-side cleaners typically is filtered remotely. By contrast, robotic and pressure-side APCs usually include on-board filtration, with a filter carried on, in, or with an associated body of an APC as the body moves within a pool. Because the filters frequently are submerged in use and often positioned within the bodies of many robotic cleaners, they are not easily visible externally of the pools. Clogging of the filters thus may remain unnoticed for extended periods, significantly reducing the cleaning and operational efficiencies of the corresponding APCs.

Various methods have been devised to resolve issues of filter clogging of APCs. U.S. Pat. No. 5,961,822 to Polimeni, Jr., for example, describes a non-autonomous pool cleaner utilizing one or more rolls of "a continuous sheet of filter material." As the sheet clogs with debris, water accumulates inside the filter so as to contact a float switch. The float switch in turn activates a motor which advances the roll of filter material so that an unclogged portion is exposed to the debris-laden water.

U.S. Patent Application Publication No. 2015/0191926 of Tavor, et al., discloses a robotic pool cleaner having a two-chamber filter. As debris accumulates in the first chamber, it may be sensed by an optical detector and moved—via automatic backwashing—to a second chamber of the filter. A non-return valve is employed to prevent debris in the second chamber from returning to the first chamber. Nevertheless, acknowledged in the Tavor application is that, from time to time, debris must be removed from the second chamber manually.

The entire contents of the Polimeni, Jr. patent and the Tavor application are incorporated herein by this reference. Both filings seek to reduce filter clogging through automatic activity when a switch or sensor changes state. Neither, however, contemplates notifying a user or operator of a pool that the on-board filter of an APC is clogged.

U.S. Pat. No. 6,965,814 to Hadari, whose entire contents also are incorporated herein by this reference, details another robotic cleaner having a replaceable bag filter. The robot additionally includes a controller which periodically samples current to an impeller motor. As noted in the Hadari patent: "When the instantaneous sampled current exceeds a preset threshold value, . . . [the controller] issues a signal activating an indicator, e.g., a warning light, showing that the filter is partly clogged." No clogging assessment is contemplated other than based on sampled current to the motor, however.

SUMMARY OF THE INVENTION

The present invention provides to users, operators, or others information relating to clogging of filters associated with APCs. It is especially useful for APCs (particularly robotic cleaners) having on-board pumps. At least some principles of the invention may apply to systems in which pumps are not necessarily on-board APCs, however.

APCs consistent with the present invention may include at least one pressure sensing mechanism. As a filter clogs, pressure at the pump inlet decreases. By comparing the pump-inlet pressure with the ambient pressure to which an APC is subjected, for example, information about the amount of filter loading may be obtained.

In at least some versions of the invention, an APC may include a magnet and spring positioned in a tube or other chamber. One end of the tube is adjacent, and thus subjected principally to the suction pressure provided at, the pump inlet, while the other end of the tube is remote from the pump inlet and subjected principally to ambient pressure. Preferably the end adjacent the pump inlet is above the other end when the cleaner is upright.

As the filter loads and pump inlet pressure decreases, the magnet moves upward. Appropriate choice of the spring force partially opposing magnet movement allows the magnet to move slowly within the tube. When the magnet moves to a particular location based on the filter loading, it may interact with a component such as a reed switch or Hall effect sensor.

Interaction of the magnet with a reed switch causes the switch to change state (from open to closed or vice-versa). Electric or electronic circuitry associated with the reed switch may utilize the state change to indicate that the filter is clogged. Such indication may be as simple as illuminating (or extinguishing) a light on a body of the cleaner identifying the filter as needing cleaning. Alternatively, the state change of the reed switch could cause an electronic transmission to, for example, a user's smartphone indicating that the filter is clogged. Persons skilled in the art will recognize that yet other types of indications may be provided.

Similarly, interaction of the magnet with a Hall effect sensor could provide information as to the extent of loading of the filter, much like conventional automotive fuel gauges supply indications as to amounts of fuel remaining in tanks. Output of the sensor would be proportional to the vacuum in the pump suction volume. The output may be processed and provided to interested parties in any suitable manners, including (but not limited to) by electronic transmission to a smartphone.

The appended drawings illustrate portions of an APC and an exemplary pressure sensing mechanism. At least if the APC is a robot, it may include on-board electronic processing capability. One or more processors may be incorporated into a printed circuit board (PCB) which also, if desired, may include some or all components of the pressure sensing mechanism. The PCB, further, may be installed within a motor block of the APC. A bypass for the filter also may be included in the APC and could be activated if the mechanism indicates that the filter is clogged.

BRIEF DESCRIPTION OF THE DRAWINGS

FIG. 1A is a perspective view similar to FIG. 1, whereas

DETAILED DESCRIPTION

Figure 1:
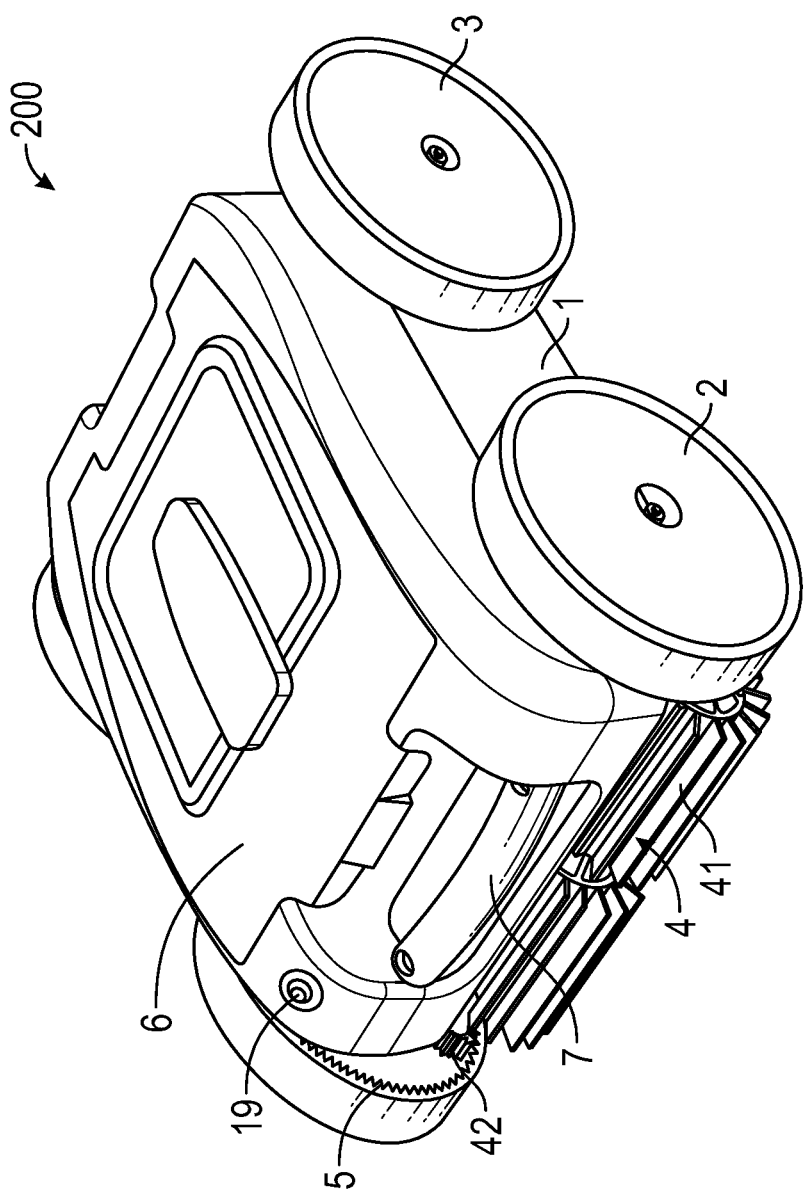
FIG. 1 is a perspective view of an exemplary robotic APC.
Figure 1A:
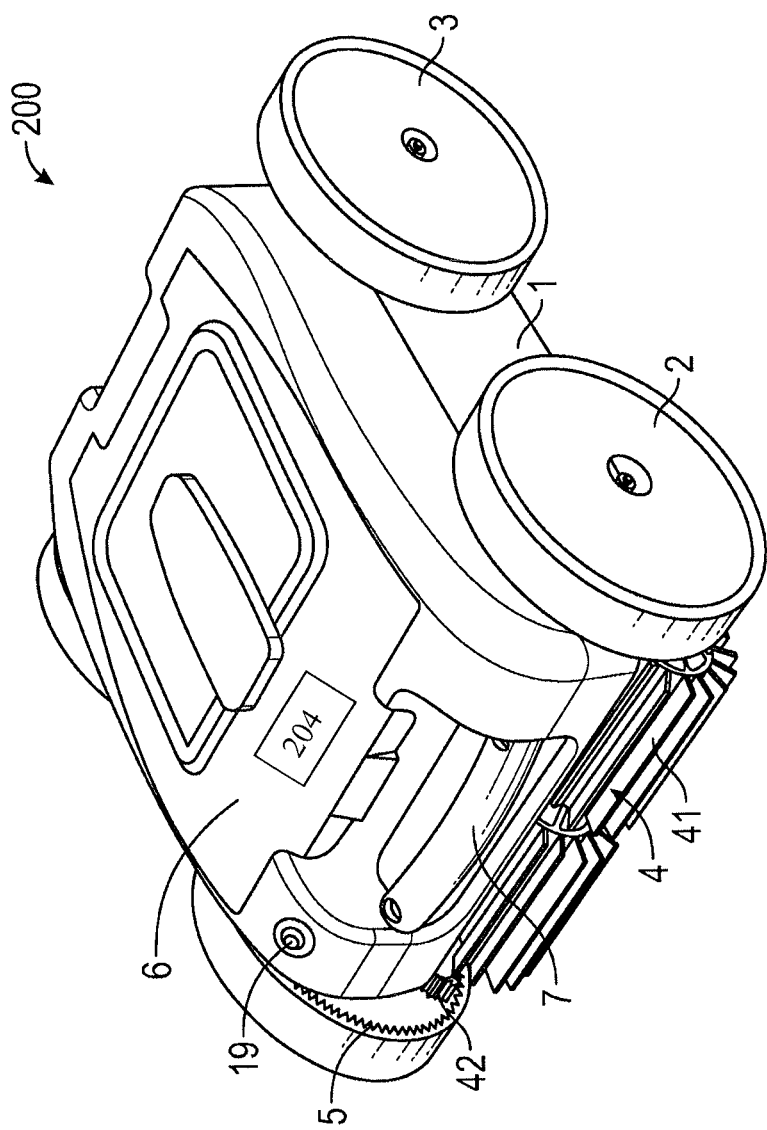
Figure 2:
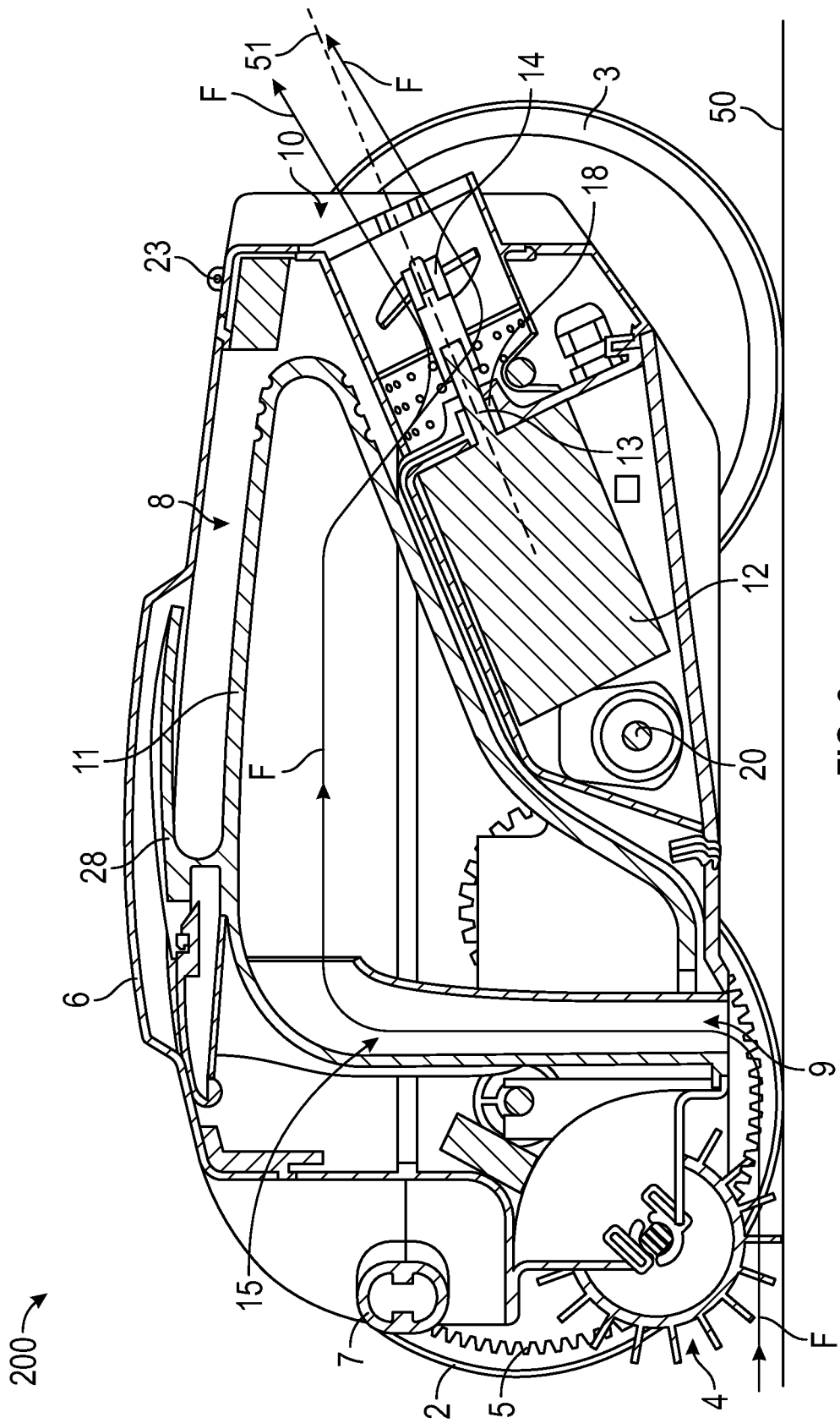
FIG. 2 is a cross-sectional view of the APC of FIG. 1 schematically illustrating a water flow path through an on-board debris filter of the APC.
Figure 2A:
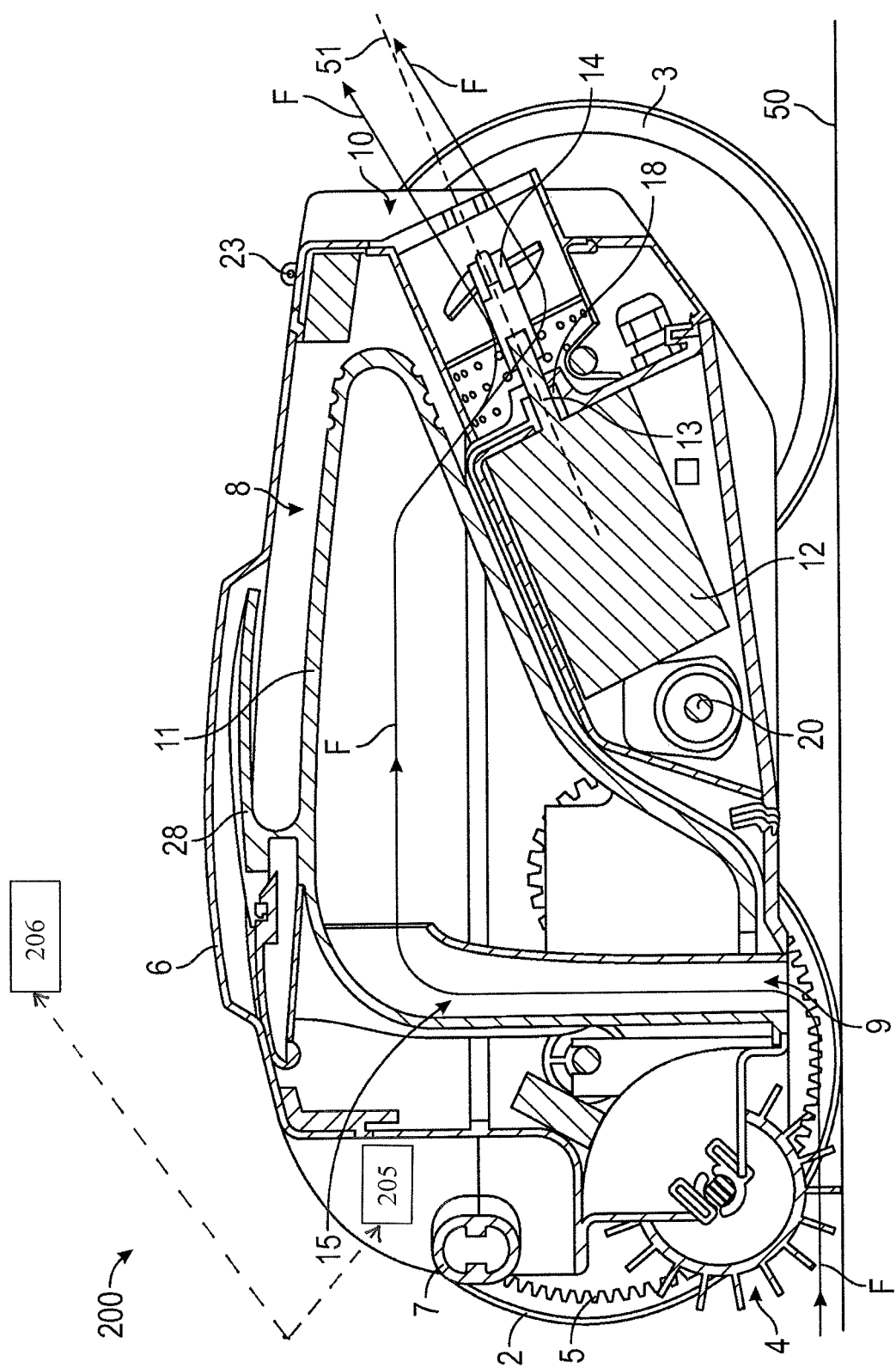
FIG. 2A is a cross-sectional view similar to FIG. 2.

FIG. 1, and much of FIG. 2, appear in U.S. Pat. No. 8,627,533 to Pichon, et al., whose entire contents are incorporated herein by this reference. As depicted, APC 200 may include, among other components, body 1, travel members (e.g., 2, 3), and a debris filter such as filtering device 11. APC 200 additionally may include a pump comprising motor 12, drive shaft 13, and propeller 14. Shown particularly by lines F of FIG. 2 is that, under influence of the pump, debris-laden water of a swimming pool or spa may be drawn into body 1 via inlet 9, pass through filtering device 11, and exit body 1 via outlet 10. Much of the debris initially contained in the water will be retained within filtering device 11, causing device 11 to clog, or load, as APC 200 operates.

Figure 3A:
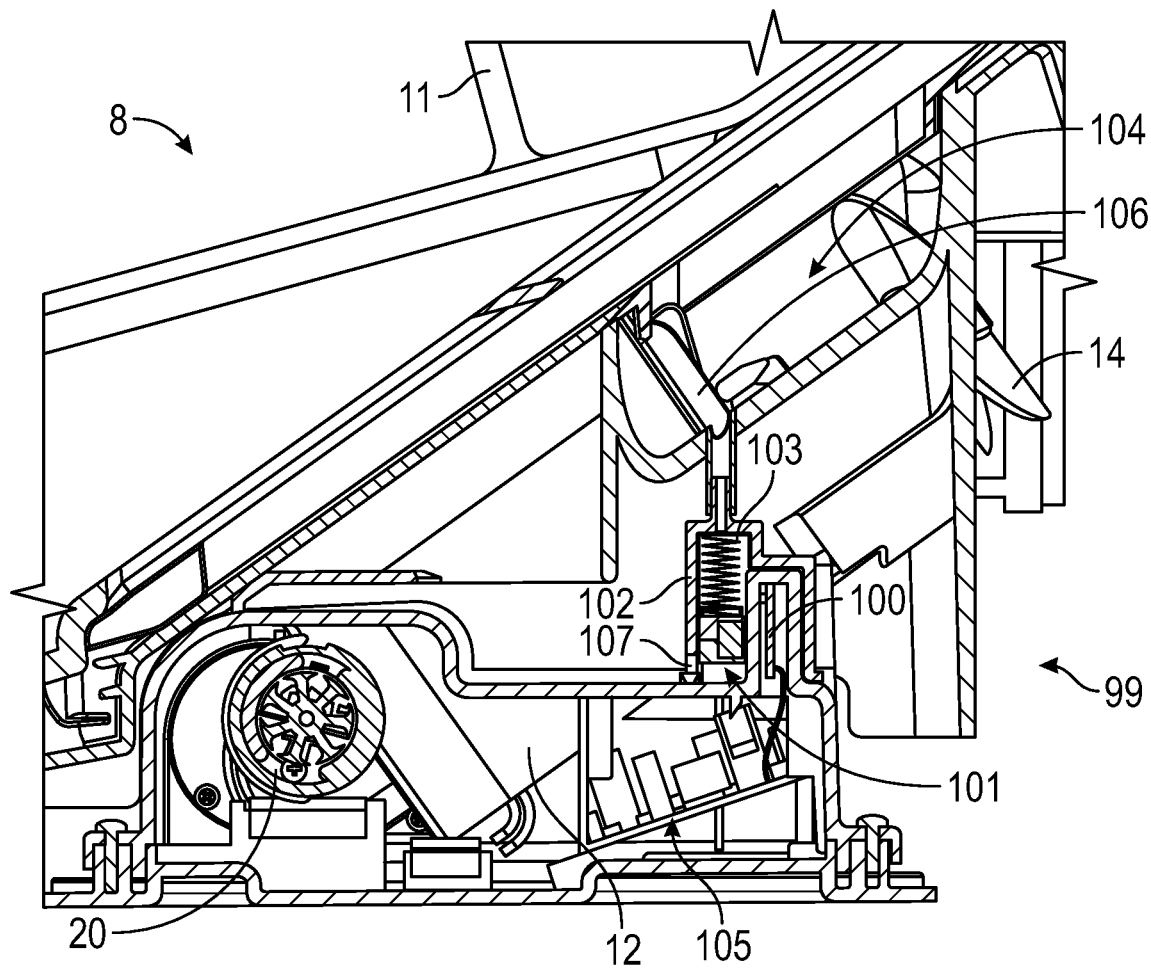
FIG. 3A is a schematicized sectional view of an APC similar to that of FIG. 1 showing an exemplary differential pressure sensor of the present invention when the on-board debris filter of the APC is relatively clean (i.e. unclogged or unloaded).

FIGS. 3A-B and 6A-B show exemplary sensor assembly 99 positioned within body 1 of APC 200. Sensor assembly 99 preferably responds to differences in pressure existing at the pump inlet as compared to the ambient pressure to which APC 200 is subjected. At least some embodiments of sensor assembly 99 may include PCB 111 (see FIG. 4) comprising sensor card 100 equipped with a Hall effect sensor 110. A suitable version of Hall effect sensor 110 may be obtained from Honeywell as sold under the designation "SS39ET," although persons skilled in the art will recognize that other versions may be at least equally suitable for use in connection with the present invention. Hall effect sensor 110 may be powered and have its output signals processed in any appropriate way, with FIG. 4 illustrating wires 112 electrically connecting PCB 111 to a main in-board PCB 105 (normally responsible, e.g., for controlling at least motors 12 and 20).

Presently preferred is that PCB 111 (including card 100) be located within a waterproof portion of body 1 as, for example, within the motor block including motor 12. PCB 111, or some or all components thereof, additionally may be incorporated onto main in-board PCB 105 if desired. Alternatively, a separate enclosure or board may be used.

Figure 5:
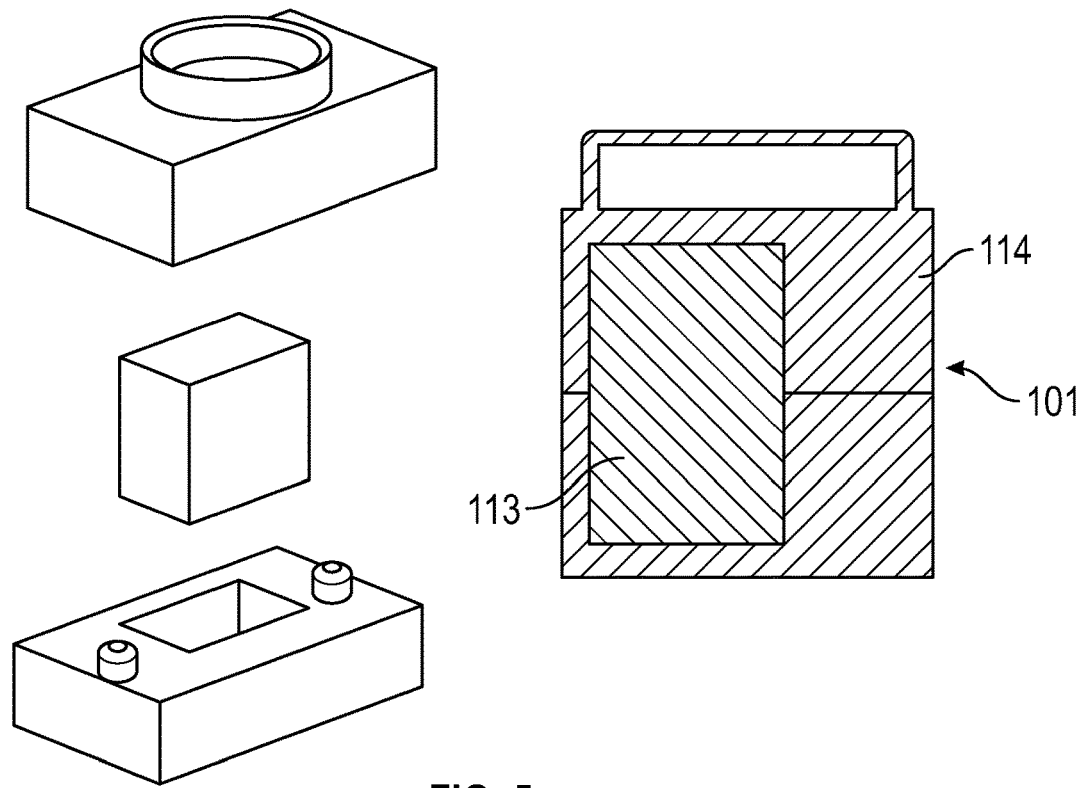
FIG. 5 includes schematicized exploded and sectional views of an exemplary magnet assembly useful as part of the differential pressure sensor of FIGS. 3A-B.

Sensor assembly 99 additionally may comprise magnet assembly 101 (see also FIG. 5). Magnet assembly 101 includes at least one magnet 113 which may be housed in housing 114. Magnet 113 may be formed of any suitable material including, as non-limiting examples, neodymium, samarium cobalt, or ferrite ceramic. When present, housing 114 may function to protect magnet 113 from corrosion as well as create a moveable shuttle containing the magnet 113. Housing 114 need not necessarily be used, however, especially when magnet 113 is resistant to corrosion.

Enclosure 102 further may form a part of sensor assembly 99. Enclosure 102 advantageously includes first and second apertures 106 and 107, respectively. First aperture 106 preferably is positioned at or near inlet 104 to the pump of APC 200, while second aperture 107 preferably is positioned remote therefrom. However, such positioning is not strictly necessary, as first aperture 106 alternatively may be located in any area of body 1 downstream of filtering device 11, and second aperture 107 alternatively may be positioned essentially anywhere upstream of device 11.

Enclosure 102 forms chamber 300 in which magnet assembly 101 is placed between first and second apertures 106 and 107. Chamber 300 preferably is sized so as to allow magnet assembly 101 to move linearly (up and down in the views of FIGS. 3A-B and 6A-B), with such displacement occurring due to difference in water pressure existing at first and second apertures 106 and 107. Sizing of chamber 300 preferably also allows for only a small gap to exist between magnet assembly 101 and side walls 304 of the chamber 300, minimizing the possibility of water transfer within the chamber 300 from one side of magnet assembly 101 to the other.

Sensor assembly 99 further may include a biasing means such as spring 103. In the depicted version of assembly 99, spring 103 is a compression spring located within chamber 300 between first aperture 106 and magnet assembly 101. The biasing force of spring 103 may be used to calibrate or adjust the stroke of magnet assembly 101 to the normal pressure variation likely to be sensed between pump inlet 104 and ambient when filter device 11 is clean or clogged. Alternatively, a biasing means such as a traction spring may be positioned between second aperture 107 and magnet assembly 101. Yet alternatively, no biasing means need be employed, although in (at least) such case Hall effect sensor 110 likely could be replaced by a reed switch.

Figure 6A:
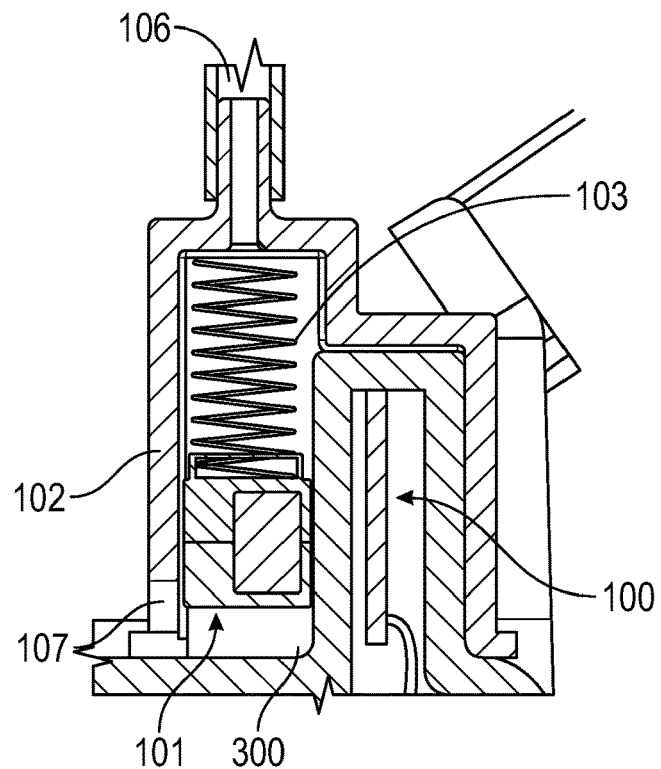
FIGS. 6A-B are close-up views of the APC of FIGS. 3A-B, respectively.
Figure 7:
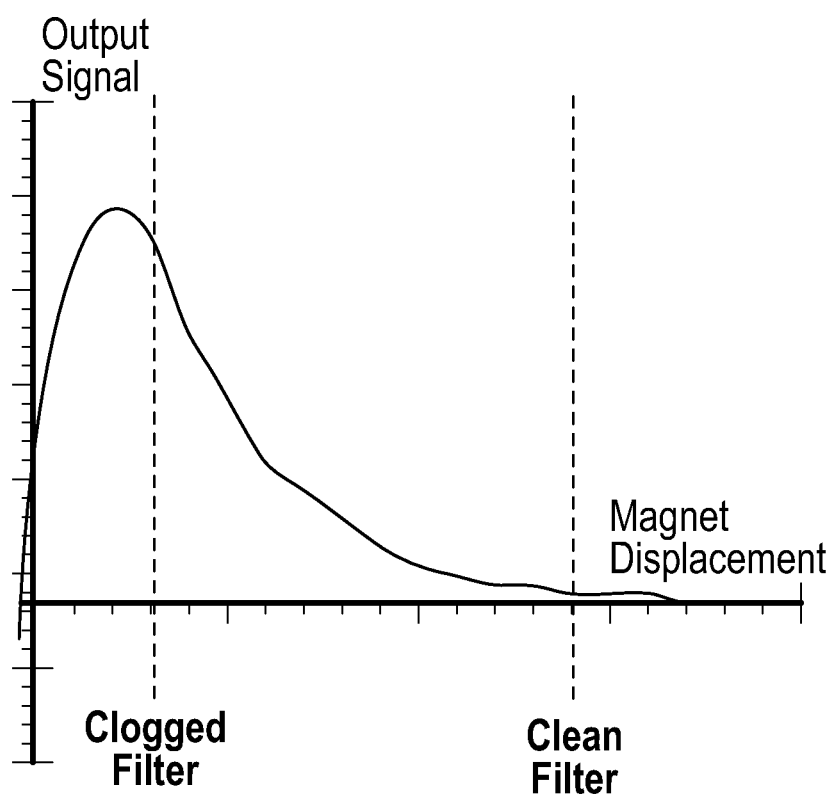
FIG. 7 is a graph illustrating an example of possible output signal (e.g., voltage, current, frequency, etc.) of a Hall effect sensor as a function of magnet displacement in connection with the present invention.

FIG. 7 provides a typical curve of output signal from Hall effect sensor 110 as a function of displacement of magnet assembly 101. When filtering device 11 is relatively clean of debris, water pressure at first and second apertures 106 and 107 is generally the same. Accordingly, no substantial differential pressure exists to overcome the biasing force of spring 103, and magnet assembly 101 remains within chamber 300 essentially as shown in FIGS. 3A and 6A.

Figure 3B:
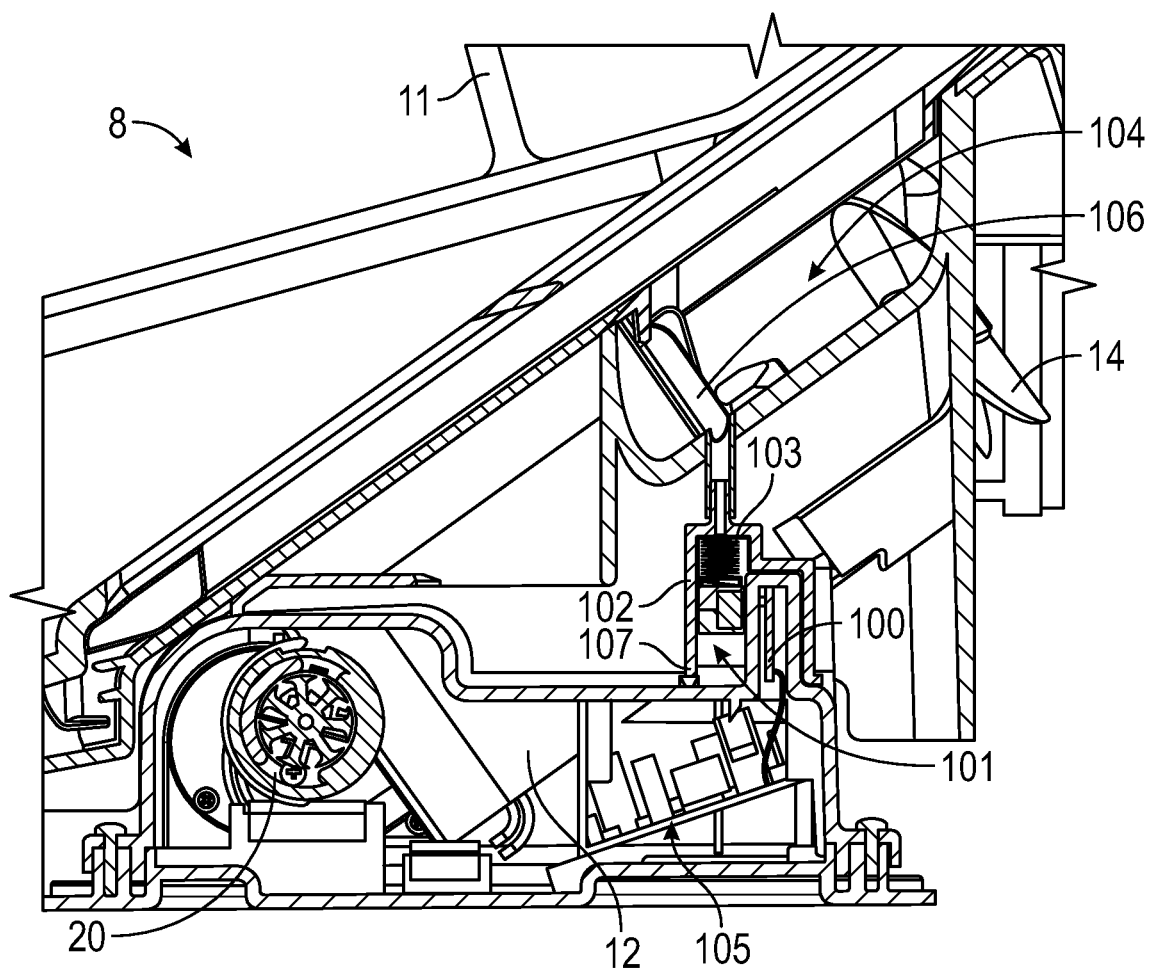
FIG. 3B is a schematicized sectional view of the APC of FIG. 3A showing the exemplary differential pressure sensor when the on-board debris filter of the APC is relatively dirty (i.e. clogged or loaded).
Figure 4:
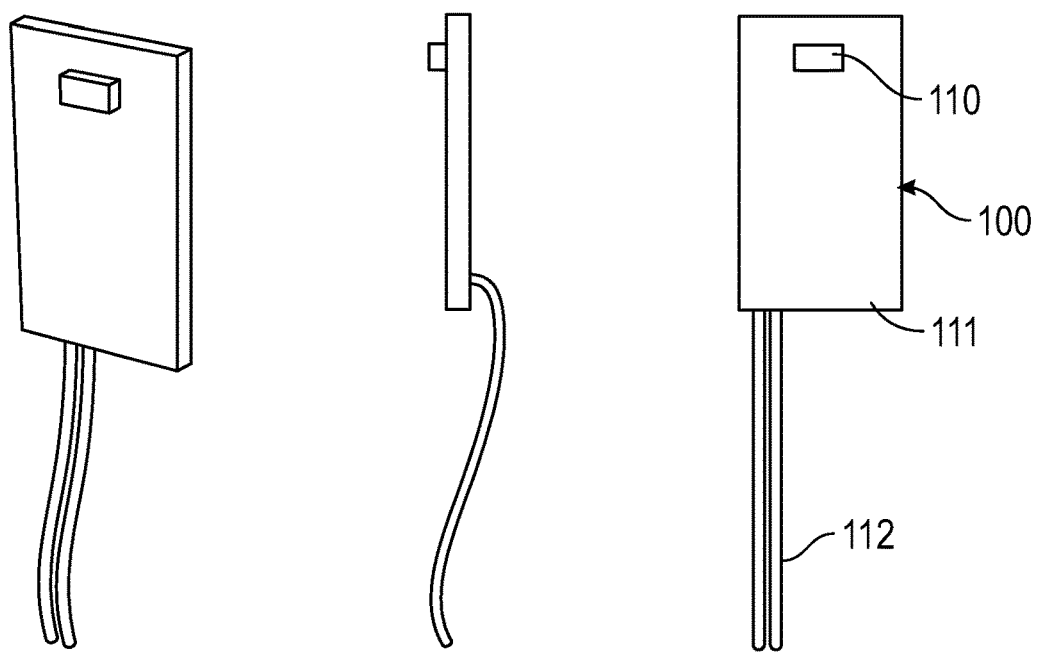
FIG. 4 is a set of schematized views of an exemplary PCB including components of the differential pressure sensor of FIGS. 3A-B.
Figure 6B:
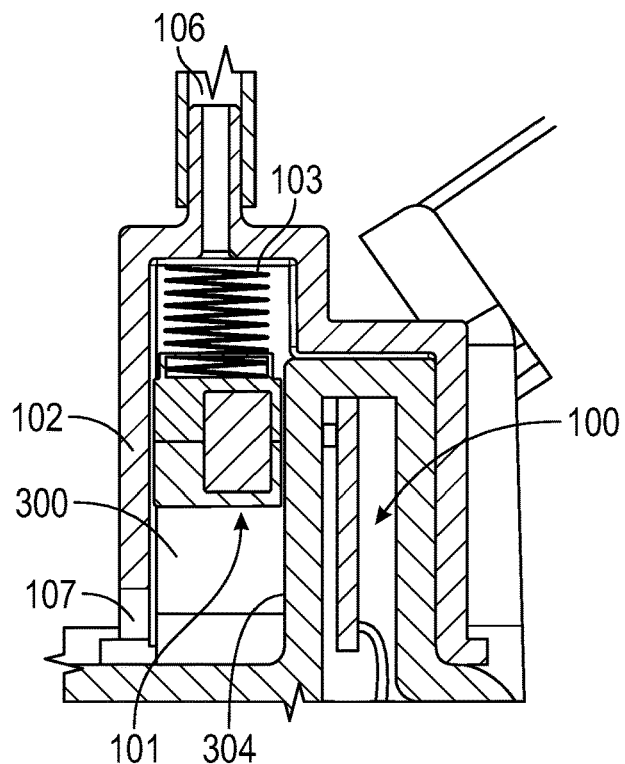

As filtering device 11 clogs with debris differential pressure is created, overcoming the force of spring 103 and thereby displacing magnet assembly 101 (upward as shown in FIGS. 3B and 6B) within chamber 300. This displacement is registered by Hall effect sensor 110 by raising its output signal, as shown in FIG. 7. The increased output signal thus evidences increasing loading of filter device 11. In other embodiments, the magnet displacement need not be upward, but rather could be in any orientation suitable in connection with the implementation of sensor assembly 99 within APC 200.

Output of Hall effect sensor 110 may be processed in any suitable manner and transmitted or used as desired. For example, the output signal may be employed directly or indirectly to illuminate a light source 204 (e.g. a light-emitting diode [LED]) on body 1 of APC 200, hence providing a visual indication external to body 1 that filtering device 11 within the body 1 is clogged. Alternatively or additionally, a wired or wireless transmitter or similar device 205 associated with APC 200 may transmit a radio frequency (RF) or other signal directly or indirectly to a remote device 206 such as a smartphone, tablet, or computer in order to alert a user that filtering device 11 is clogged. Information regarding the cleanliness of filtering device 11 also could be transmitted to a service technician, an APC manufacturer or seller, or otherwise as desired in an effort to provoke removal of debris from the device 11 when clogged or to study effects of the loading of device 11.

The foregoing is provided for purposes of illustrating, explaining, and describing embodiments of the present invention. Modifications and adaptations to these embodiments will be apparent to those skilled in the art and may be made without departing from the scope or spirit of the invention. In particular, the invention encompasses all possible modifications and variations within the scope of the claims appended hereto (and their equivalents). For avoidance of doubt, any combination of features not physically impossible or expressly identified as non-combinable herein may be within the scope of the invention. Further, although applicant has described devices and techniques for use principally with APCs, persons skilled in the relevant field will recognize that the present invention may be employed in connection with other objects (e.g., chlorinators, heat pumps, etc.) and in other manners. Finally, references to "pools" and "swimming pools" herein may also refer to spas or other water containing vessels used for recreation or therapy and for which cleaning of debris is needed or desired.

What is claimed is:

1. An automatic swimming pool cleaner comprising:
   a. a body including a fluid inlet and a fluid outlet;
   b. a debris filter, at least a portion of which is positioned between the fluid inlet and the fluid outlet; and
   c. a pressure sensor assembly configured to evidence accumulation of debris in the debris filter and comprising:
      i. a magnet; and
      ii. means, comprising a Hall effect sensor or a reed switch, configured to interact with the magnet.

2. An automatic swimming pool cleaner according to claim 1 in which the pressure sensor assembly further comprises an enclosure within which the magnet moves, the enclosure defining first and second apertures.

3. An automatic swimming pool cleaner according to claim 2 further comprising a pump having an inlet and in which the first aperture is positioned at or near the inlet of the pump.

4. An automatic swimming pool cleaner according to claim 3 in which the magnet moves within the enclosure in response to difference in water pressure at the first and second apertures.

5. An automatic swimming pool cleaner according to claim 4 in which the pressure sensor assembly further comprises a spring at least partially within the enclosure, the spring opposing movement of the magnet.

6. An automatic swimming pool cleaner according to claim 5 further comprising means for indicating accumulation of debris in the debris filter.

7. An automatic swimming pool cleaner according to claim 6 in which the means for indicating accumulation of debris in the debris filter comprises a light source visible externally of the body.

8. An automatic swimming pool cleaner according to claim 6 in which the means for indicating accumulation of debris in the debris filter comprises an electronic transmitter.

9. An automatic swimming pool cleaner according to claim 1 further comprising wired or wireless means for electronically transmitting information relating to accumulation of debris in the debris filter to an electronic receiver separate from the body.

10. An automatic swimming pool cleaner comprising:
    a. a body including a fluid inlet and a fluid outlet;
    b. a debris filter, at least a portion of which is positioned between the fluid inlet and the fluid outlet;
    c. a pump positioned at least partly within the body and including an inlet;
    d. means for moving the body autonomously within a swimming pool;
    e. a differential pressure sensor assembly configured to evidence accumulation of debris in the debris filter and comprising: (i) a magnet assembly comprising (A) a housing and (B) a magnet contained within the housing; (ii) a Hall effect sensor whose output is a function of its proximity to the magnet; (iii) an enclosure (A) defining (1) a first aperture positioned at or near the inlet of the pump and (2) a second aperture and (B) within which the magnet moves in response to difference in water pressure at the first and second apertures; and (iv) a spring positioned at least partially within the enclosure and configured to oppose movement of the magnet; and
    f. means for indicating accumulation of debris in the debris filter.

11. A method of operating an automatic swimming pool cleaner, comprising:
    a. causing the automatic swimming pool cleaner to move autonomously within a swimming pool; and
    b. receiving at a device located remote from the automatic swimming pool cleaner, electronically transmitted information indicating accumulation of debris in a debris filter of the automatic swimming pool cleaner.

12. A method according to claim 11 in which the step of receiving transmitted information comprises receiving transmitted information generated as a result of differential water pressure existing within a body of the automatic swimming pool cleaner, such differential water pressure evidenced by a pressure sensor assembly comprising (a) a magnet and (b) means, comprising a Hall effect sensor or a reed switch, configured to interact with the magnet.

13. A method of operating an automatic swimming pool cleaner, comprising:
    a. causing the automatic swimming pool cleaner to move autonomously within a swimming pool; and
    b. receiving information indicating accumulation of debris in a debris filter of the automatic swimming pool cleaner, such information (i) generated as a result of differential water pressure existing within a body of the automatic swimming pool cleaner and (ii) comprising an indication visible externally of the automatic swimming pool cleaner provided by illumination of a light source associated with a body of the automatic swimming pool cleaner.

\* \* \* \* \*